(12) United States Patent
Iijima et al.

(10) Patent No.: US 11,215,473 B2
(45) Date of Patent: Jan. 4, 2022

(54) DRIVING SUPPORT DEVICE, DRIVING SUPPORT METHOD, AND NON-TRANSITORY RECORDING MEDIUM IN WHICH PROGRAM IS STORED

(71) Applicant: TOYOTA JIDOSHA KABUSHIKI KAISHA, Toyota (JP)

(72) Inventors: Akira Iijima, Nagoya (JP); Hiroaki Sakakibara, Nagoya (JP); Yohei Kubo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 16/598,217

(22) Filed: Oct. 10, 2019

(65) Prior Publication Data

US 2020/0166369 A1 May 28, 2020

(30) Foreign Application Priority Data

Nov. 27, 2018 (JP) .............................. JP2018-221409

(51) Int. Cl.
| | |
|---|---|
| *G01C 21/00* | (2006.01) |
| *G01C 21/36* | (2006.01) |
| *B60K 35/00* | (2006.01) |
| *B60Q 9/00* | (2006.01) |
| *G06F 3/14* | (2006.01) |
| *G06F 3/16* | (2006.01) |
| *G05D 1/00* | (2006.01) |

(52) U.S. Cl.
CPC .......... *G01C 21/3655* (2013.01); *B60K 35/00* (2013.01); *B60Q 9/00* (2013.01); *G01C 21/3629* (2013.01); *G06F 3/14* (2013.01); *G06F 3/165* (2013.01); *B60K 2370/1575* (2019.05); *B60K 2370/166* (2019.05); *G05D 1/0088* (2013.01)

(58) Field of Classification Search
None
See application file for complete search history.

(56) References Cited

U.S. PATENT DOCUMENTS

| | | | | |
|---|---|---|---|---|
| 2016/0119897 | A1* | 4/2016 | Kim | ..................... H04W 68/04 |
| | | | | 455/569.2 |
| 2016/0225367 | A1* | 8/2016 | Sugiyama | ............... G10L 13/00 |
| 2017/0101056 | A1* | 4/2017 | Park | ......................... B60R 1/00 |
| 2017/0315556 | A1 | 11/2017 | Mimura et al. | |

FOREIGN PATENT DOCUMENTS

| | | |
|---|---|---|
| JP | 2017-200786 A | 11/2017 |
| WO | WO 2015/037396 A1 | 3/2015 |

* cited by examiner

*Primary Examiner* — James M McPherson
(74) *Attorney, Agent, or Firm* — Oblon, McClelland, Maier & Neustadt, L.L.P.

(57) ABSTRACT

A control device as a driving support device includes a processor configured such that the processor receives respective voice output instructions from an automatic driving device and a car navigation device provided in a vehicle, and when respective timings to output voice from the automatic driving device and from the car navigation device overlap with each other, the processor performs a control to display a content corresponding to a content of the voice output from the automatic driving device for a longer time than a time to display the content of the voice in a case where the timings do not overlap with each other.

7 Claims, 2 Drawing Sheets

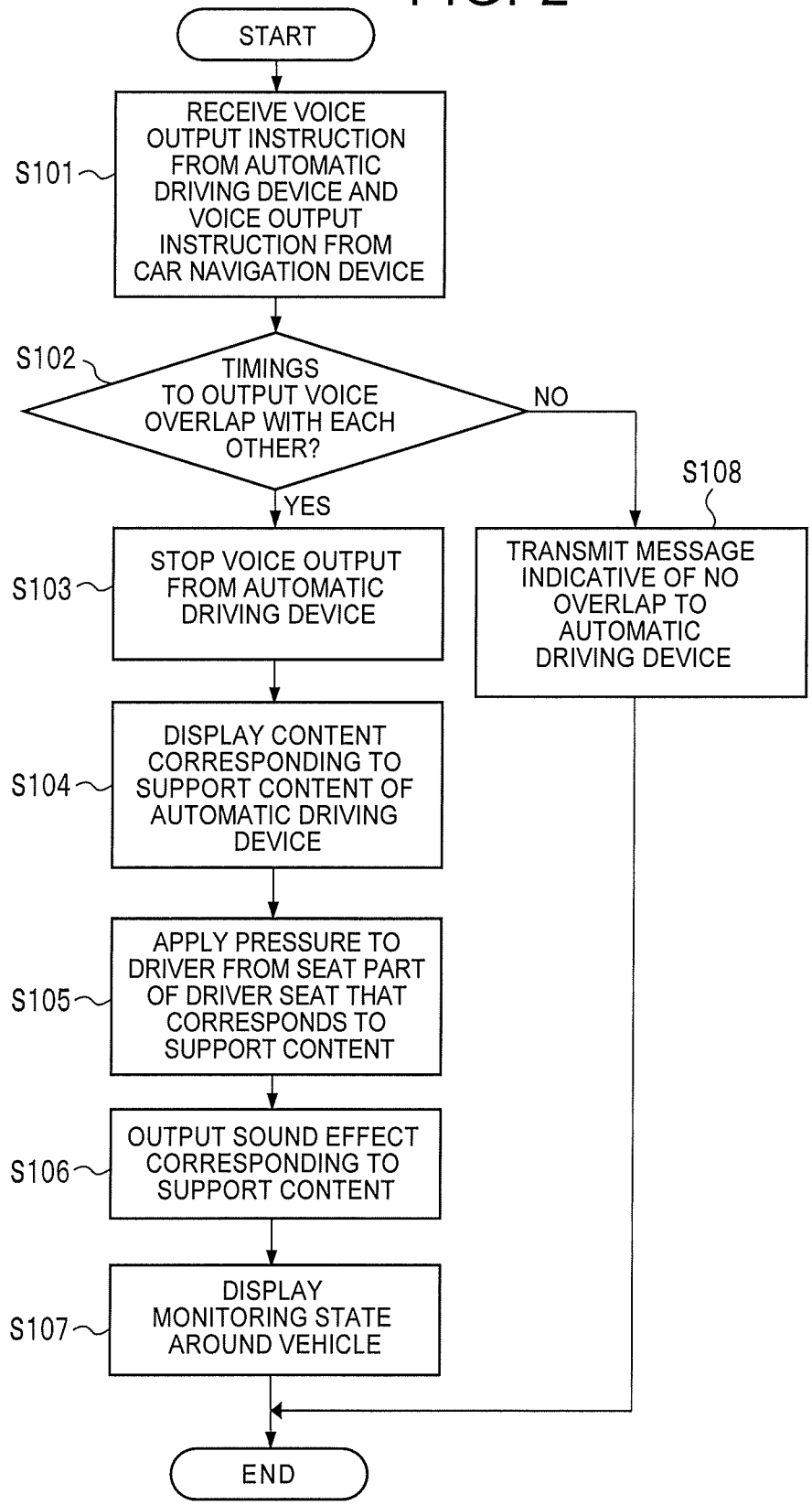

DRIVING SUPPORT DEVICE, DRIVING SUPPORT METHOD, AND NON-TRANSITORY RECORDING MEDIUM IN WHICH PROGRAM IS STORED

INCORPORATION BY REFERENCE

The disclosure of Japanese Patent Application No. 2018-221409 filed on Nov. 27, 2018 including the specification, drawings and abstract is incorporated herein by reference in its entirety.

BACKGROUND

1. Technical Field

The disclosure relates to a driving support device, a driving support method, and a non-transitory recording medium in which a program is stored.

2. Description of Related Art

WO 2015/037396 describes a voice output control device configured such that, when a plurality of output requests is supplied, levels of information values set in advance for respective pieces of voice information corresponding to the output requests are compared with each other, and voice information with a higher information value is output preferentially. The voice output control device supports driving in such a manner that an information value is variably set depending on whether a content corresponding to each piece of voice information is output from a display device or not and pieces of voice information is sequentially output in order of one with a higher information value.

SUMMARY

Here, as a system for supporting driving, an automatic driving device is developed. An automatic driving device with an automatic driving level "2" that is currently developed mainly is just to support a driving operation of a vehicle such as a steering operation or acceleration and deceleration, and therefore, it is necessary for a driver to monitor a driving condition. Accordingly, the automatic driving device is provided with a function to guide the driving condition of the vehicle by voice as a function to support monitoring of the driving condition.

In the voice output control device described in WO 2015/037396, an output timing of voice information with a low information value is delayed. However, voice guidance of the automatic driving device generally does not make sense if the voice guidance is not output at a right point, and if the output timing is delayed, the voice guidance might become meaningless.

In view of this, an object of the disclosure is to provide a driving support device and a driving support method each of which can surely transmit guidance from an automatic driving device to a driver, and a non-transitory recording medium in which a program is stored.

A driving support device according to one aspect of the disclosure includes a processor configured such that the processor receives respective voice output instructions from an automatic driving device and a car navigation device provided in a vehicle, and when respective timings to output voice from the automatic driving device and from the car navigation device overlap with each other, the processor performs a control to display a content corresponding to a content of the voice output from the automatic driving device for a longer time than a time to display the content of the voice in a case where the timings do not overlap with each other.

In the above aspect, when the timings overlap with each other, the processor may further perform a control to apply a pressure to a driver from a seat part of a driver seat, the seat part corresponding to the content of the voice output from the automatic driving device.

In the above aspect, when the timings overlap with each other, the processor may further perform a control to output a sound effect that corresponds to the voice content output from the automatic driving device.

In the above aspect, when the timings overlap with each other, the processor may further perform a control to display a monitoring state around the vehicle.

In the above aspect, when the timings overlap with each other, the processor may further perform a control to stop the output of the voice from the automatic driving device.

A driving support method according to another aspect of the disclosure is a driving support method executed by a processor, and the driving support method includes a controlling step of receiving respective voice output instructions from an automatic driving device and a car navigation device provided in a vehicle, and when respective timings to output voice from the automatic driving device and from the car navigation device overlap with each other, displaying a content corresponding to a content of the voice output from the automatic driving device for a longer time than a time to display the content of the voice in a case where the timings do not overlap with each other.

A non-transitory recording medium according to another aspect of the disclosure is a non-transitory recording medium in which a program is stored, and the program causes a computer to function as a controlling portion configured such that the controlling portion receives respective voice output instructions from an automatic driving device and a car navigation device provided in a vehicle, and when respective timings to output voice from the automatic driving device and from the car navigation device overlap with each other, the controlling portion performs a control to display a content corresponding to a content of the voice output from the automatic driving device for a longer time than a time to display the content of the voice in a case where the timings do not overlap with each other.

With the disclosure, it is possible to provide an automatic driving device, a car navigation device, and a driving support system each of which can surely transmit guidance from the automatic driving device to a driver.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart to describe a procedure of a support content notification process in the embodiment.

DETAILED DESCRIPTION OF EMBODIMENTS

Figure 1:
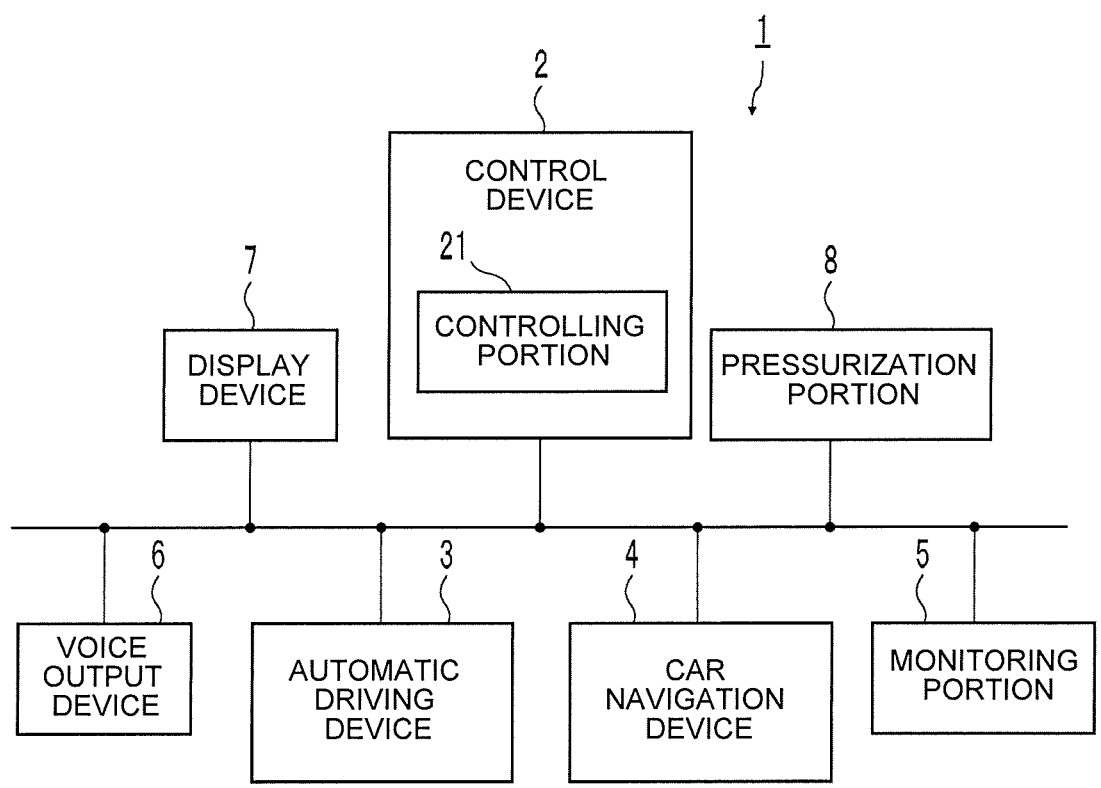
FIG. 1 is a view illustrating a schematic configuration of a driving support system in an embodiment.

With reference to the attached drawings, the following describes a preferred embodiment of the disclosure. Note that, in each figure, members having the same reference sign have the same or similar configuration. A driving support system including an automatic driving device and a car navigation device in the embodiment is a system provided in a vehicle and configured to support driving of a driver as a user.

A schematic configuration of a driving support system 1 in the embodiment will be described with reference to FIG. 1. The driving support system 1 includes a control device (driving support device) 2, an automatic driving device 3, a car navigation device 4, a monitoring portion 5, a voice output device 6, a display device 7, and a pressurization portion 8. These constituents are connected to each other via a communications bus in a mutually communicable manner.

The automatic driving device 3 corresponds to the automatic driving level "2" and has an automatic driving support function to support, by use of voice or the like, a driving operation, e.g., a steering operation, acceleration and deceleration, and the like of a vehicle. A well-known automatic driving support function can be applied to the automatic driving support function appropriately.

The car navigation device 4 has a navigation function to guide a route (travel route) from a current position to a destination by use of voice or the like. A well-known navigation function can be applied to the navigation function appropriately.

As a physical configuration, the automatic driving device 3 and the car navigation device 4 are each constituted by a control unit including a central processing unit (CPU) and a memory, an operation portion, a display, a speaker, and a communication device. When the CPU executes a predetermined program stored in the memory, the automatic driving support function of the automatic driving device 3 or the navigation function of the car navigation device 4 is implemented.

The monitoring portion 5 is constituted by various devices for monitoring a state around the vehicle. The state around the vehicle includes presence of obstacle, presence of pedestrian, travel states of other vehicles, and so on, for example. The monitoring portion 5 can include a sensor device such as an image sensor, a camera, a millimeter wave radar, or a light detection and ranging (LiDAR), a vehicle-to-vehicle communication apparatus, a roadside-to-vehicle communication apparatus, and the like.

The voice output device 6 is a speaker, for example, and outputs voice, music, or the like. The display device 7 is a display including a display panel for a meter or the like, for example, and a text, an image, a dynamic image, and the like are displayed on the display device 7. The pressurization portion 8 has a mechanism configured to drive an electric motor and apply a pressure to a driver sitting on a driver seat, for example.

A controlling portion 21 (a processor) of the control device 2 executes a support content notification process of notifying the driver of a support content (guidance) of automatic driving, for example. The support content notification process is executed when respective timings to output voice from the automatic driving device 3 and from the car navigation device 4 overlap with each other.

The controlling portion 21 determines whether the timings to output voice overlap with each other or not, based on respective voice output instructions to be received from the automatic driving device 3 and the car navigation device 4. The voice output instruction includes information to specify a voice output timing.

In the support content notification process, the controlling portion 21 executes processes from process (1) to process (5) as follows. The processes from process (1) to process (5) may be all executed or some of the processes may be selectively executed.

Process (1) is a process of displaying a content corresponding to a support content of the automatic driving device 3 for a longer time than a time to display the content in a case where the timings to output voice do not overlap with each other. More specifically, the controlling portion 21 causes the display device 7 to display the content corresponding to the support content of the automatic driving device 3 for a time obtained by adding a predetermined time to a normal display time. The content may be, for example, a text string indicative of the support content or may be an image in which illustrations are added to a text string or a dynamic image in which an animation is added to a text string. As such, when the time to display the content is extended by the predetermined time from the normal display time, it is possible to raise accuracy for the driver to recognize the support guidance of the automatic driving device 3.

Process (2) is a process of performing a control to apply a pressure to the driver from a seat part, of the driver seat, that corresponds to the support content of the automatic driving device 3. The support content of the automatic driving device 3 also includes a behavior state of the vehicle. More specifically, the controlling portion 21 drives an electric motor of the pressurization portion 8 so that a pressure is applied to the driver from the seat part, of the driver seat, that corresponds to the support content of the automatic driving device 3. For example, when the support content is "move to the left," a pressure is applied to the left thigh of the driver, and when the support content is "move to the right," a pressure is applied to the right thigh of the driver. Further, when the support content is "drive manually," a pressure is applied to the right and left thighs of the driver. As such, when a pressure is applied to the driver from the seat part, of the driver seat, that corresponds to the support content of the automatic driving device 3, it is possible to raise the accuracy for the driver to recognize the support content of the automatic driving device 3, including the behavior state of the vehicle.

Process (3) is a process of outputting a sound effect corresponding to the support content of the automatic driving device 3. More specifically, the controlling portion 21 causes the voice output device 6 to output the sound effect corresponding to the support content of the automatic driving device 3. As such, when the sound effect corresponding to the support content is output, it is possible to raise the accuracy for the driver to recognize the support content of the automatic driving device 3.

Process (4) is a process of displaying a monitoring state around the vehicle. More specifically, the controlling portion 21 causes the display device 7 to display a monitoring state around the vehicle. The monitoring state around the vehicle is provided by performing analysis by use of various pieces of data acquired by the monitoring portion 5. When the monitoring state around the vehicle is displayed, the driver can easily grasp a state around the vehicle during automatic driving.

Process (5) is a process of stopping voice output from the automatic driving device 3. More specifically, the controlling portion 21 transmits a voice output stop request to the automatic driving device 3. Hereby, the driver can easily recognize the voice of the car navigation device 4.

With reference to FIG. 2, the following describes an example of a procedure of the support content notification process executed by the control device 2.

First, the controlling portion 21 of the control device 2 receives a voice output instruction from the automatic driving device 3 and a voice output instruction from the car navigation device 4 (step S101).

Subsequently, the controlling portion 21 determines whether or not respective timings to output voice, included in the voice output instructions received in step S101, overlap with each other (step S102).

When it is determined, in step S102, that the timings to output voice overlap with each other (step 102; YES), the controlling portion 21 stops the voice output from the automatic driving device 3 (step S103).

Subsequently, the controlling portion 21 causes the display device 7 to display a content corresponding to the support content of the automatic driving device 3 for a time longer than the normal display time (step S104).

Subsequently, the controlling portion 21 drives the electric motor of the pressurization portion 8 so that a pressure is applied to the driver from the seat part, of the driver seat, that corresponds to the support content of the automatic driving device 3 (step S105).

Subsequently, the controlling portion 21 causes the voice output device 6 to output the sound effect corresponding to the support content of the automatic driving device 3 (step S106).

Subsequently, the controlling portion 21 causes the display device 7 to display the monitoring state around the vehicle based on various pieces of data acquired by the monitoring portion 5 (step S107). Then, the support content notification process is ended.

In the meantime, when it is determined, in step S102, that the timings to output voice do not overlap with each other (step S102; NO), the controlling portion 21 transmits, to the automatic driving device 3, a message indicating that the timings to output voice do not overlap with each other (step S108). Then, the support content notification process is ended.

As described above, with the control device 2 in the embodiment, the voice output instructions are received from the automatic driving device 3 and the car navigation device 4 provided in the vehicle, and when it is determined that the timings to output voice from the automatic driving device 3 and from the car navigation device 4 overlap with each other, a content corresponding to a voice content output from the automatic driving device 3 can be displayed for a longer time than a time to display the content in a case where the timings to output voice do not overlap with each other.

Further, with the control device 2 in the embodiment, when the timings to output voice from the automatic driving device 3 and from the car navigation device 4 overlap with each other, a control can be performed to apply a pressure to the driver from the seat part, of the driver seat, that corresponds to the voice content output from the automatic driving device 3 or a sound effect corresponding to the voice content output from the automatic driving device can be output, in addition to the above process.

Hence, with the control device 2 in the embodiment, it is possible to surely transmit the support content from the automatic driving device 3 to the driver.

Note that the disclosure is not limited to the above embodiment, and the disclosure can be performed in other various forms within a range that does not deviate from the gist of the disclosure. On this account, the embodiment is just an example in every respect and must not be interpreted restrictively. For example, the processing steps described above can be executed by changing the order of the processing steps optionally within a range that is not inconsistent with the process content, or the processing steps described above can be executed in parallel to each other.

What is claimed is:

1. A driving support device comprising a processor configured such that the processor receives respective voice output instructions from an automatic driving device and a car navigation device provided in a vehicle, and when respective timings to output voice from the automatic driving device and from the car navigation device overlap with each other, the processor performs a control to display a content corresponding to a content of the voice output from the automatic driving device for a longer time than a time to display the content of the voice in a case where the timings do not overlap with each other.

2. The driving support device according to claim 1, wherein, when the timings overlap with each other, the processor further performs a control to apply a pressure to a driver from a seat part of a driver seat, the seat part corresponding to the content of the voice output from the automatic driving device.

3. The driving support device according to claim 1, wherein, when the timings overlap with each other, the processor further performs a control to output a sound effect that corresponds to the voice content output from the automatic driving device.

4. The driving support device according to claim 1, wherein, when the timings overlap with each other, the processor further performs a control to display a monitoring state around the vehicle.

5. The driving support device according to claim 1, wherein, when the timings overlap with each other, the processor further performs a control to stop the output of the voice from the automatic driving device.

6. A driving support method executed by a processor, the driving support method comprising a controlling step of receiving respective voice output instructions from an automatic driving device and a car navigation device provided in a vehicle, and when respective timings to output voice from the automatic driving device and from the car navigation device overlap with each other, displaying a content corresponding to a content of the voice output from the automatic driving device for a longer time than a time to display the content of the voice in a case where the timings do not overlap with each other.

7. A non-transitory recording medium in which a program is stored, the program causing a computer to function as a controlling portion configured such that the controlling portion receives respective voice output instructions from an automatic driving device and a car navigation device provided in a vehicle, and when respective timings to output voice from the automatic driving device and from the car navigation device overlap with each other, the controlling portion performs a control to display a content corresponding to a content of the voice output from the automatic driving device for a longer time than a time to display the content of the voice in a case where the timings do not overlap with each other.

* * * * *